Dec. 5, 1961 O. L. LANCE 3,011,799
LOAD EQUALIZERS FOR TRAILERHOUSES
Filed Sept. 8, 1959
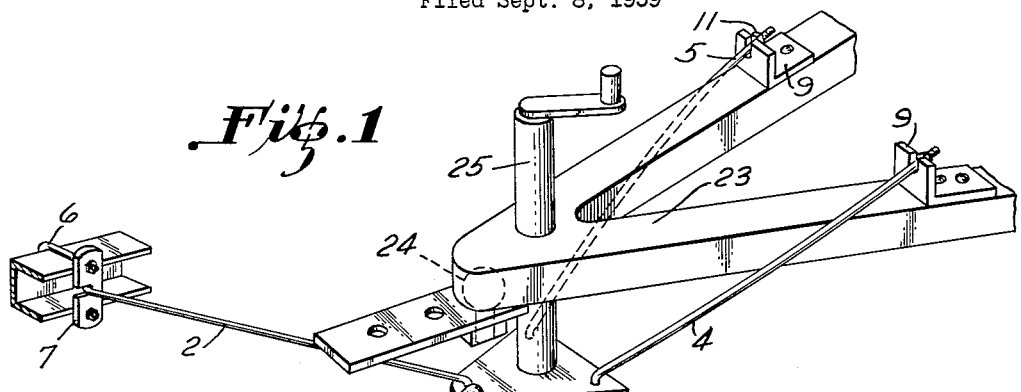
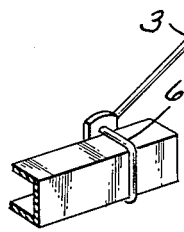
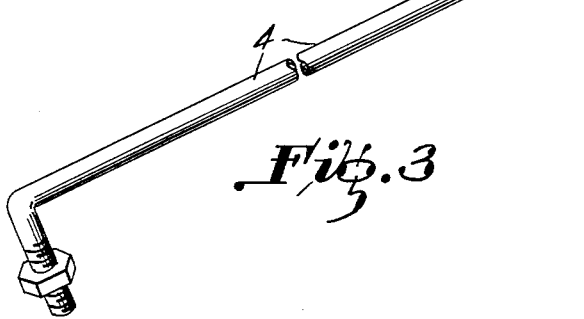
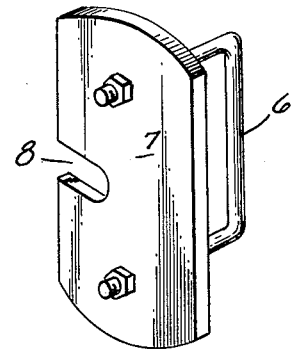
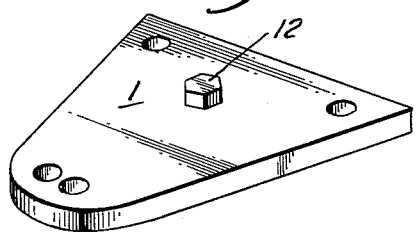
INVENTOR
Ora L. Lance

United States Patent Office 3,011,799
Patented Dec. 5, 1961

3,011,799
LOAD EQUALIZERS FOR TRAILERHOUSES
Ora L. Lance, 912 Grosse Ave., Santa Rosa, Calif.
Filed Sept. 8, 1959, Ser. No. 838,699
2 Claims. (Cl. 280—406)

This invention relates to improvements in trailerhouse hitches, and more specifically to load equalizers. More particularly the invention is adapted to prevent the trailer from rolling, rocking or weaving while being towed.

A further object of the invention is to distribute part of the weight that is normally borne by the extreme rear of a car to a more forward position on the car so the front wheels of the car as well as the wheels of the trailer will take part of the load.

It is obvious that with the standard ball hitch the rear wheels of a car when towing a trailer, act as a fulcrum exerting a lift to the front wheels of a car and putting more weight on the rear wheels. This objection is overcome in this invention by providing a series of tension rods extending from a point directly below the ball and socket joint of the standard hitch, in a manner which will be disclosed later.

The rolling, rocking and weaving of a trailer which is permitted by only a ball and socket joint hitch is greatly reduced by the bottom of the standard lifting screw being held to a braced point beneath the trailer tongue, as will be seen and claimed later in the specifications and claims.

For a further comprehension of the invention, and of the objects and advantages thereof, reference will be had to the following description and accompanying drawing, and to the appended claims in which the various novel features of the invention are more particularly set forth, in which:

FIG. 1 is a perspective view partly cut away showing this weight equalizer hitch connecting a trailer to an automobile in assembled position.

FIGS. 2, 3, 4, and 5, respectively are perspective views, showing the various parts of the weight equalizer separately, and detached from the assembly shown in FIG. 1.

Throughout the various views, like letters refer to similar parts in which 21 and 22 indicate a part of the frame of an automobile, and 23 the tongue of a trailerhouse. The common ball and socket hitch is shown by 24 which will continue to be used in conjunction with this equalizer, also the usual screw lowering and raising device is shown by 25 which normally carries a small wheel at its lower end but is removed when in operation with this equalizer.

My invention consists of a plate 1 suspended below the free end of the trailer tongue by means of four truss rods 2, 3, 4, and 5 respectively; the two front rods 2 and 3 extend forwardly and upwardly where they are secured to the frame of the car by U bolts 6 and bars 7 in the forward edges of which are slots 8 provided to receive the forward ends of rods 2 and 3. The other two rods 4 and 5 extend from the plate 1 to the rear and upward to anchor bars 9 secured to the tongue of the trailer. These anchor bars are provided with slots 10 to receive the rear end of rods 4 and 5 respectively. These rods are adjustable by means of nuts 11 threaded to the rods 4 and 5, the purpose of which is to lower or raise the plate 1 to the desired height. The object of the slots 10 and 8 is to provide means for quick removal of the device from the automobile and trailer.

The plate 1 which is triangular in shape, is provided with a pin 12 adapted to enter the lower end of the lowering and raising device 25 which is hollow and thus retain the plate in the correct position below the trailer tongue, and four holes as shown which receive the lower ends of rods 2, 3, 4, and 5 respectively, one end of each rod is bent at approximately right angles to extend through said holes. They are threaded and provided with nuts to secure them in the holes. The ends of rods 4 and 5 fit in the holes provided in the rear corners of plate 1 and are so spaced as to hold the plate in the correct position. The lower ends of rods 2 and 3 enter the plate at virtually the same point approximately right below the ball and socket joint. This is necessary so they will swivel on the same axis with the ball joint when the car is being turned or cramped.

The upper ends of rods 2 and 3 are bent horizontally at right angles and fit into slots 8 in bars 7. These ends are threaded and provided with nuts to hold them in place.

The upper ends of rods 4 and 5 are straight and are threaded to receive nuts. They fit into slots 10 and 11.

To take part of the weight of the trailer tongue from the ball and socket hitch and thus the extreme rear of the automobile and distribute it to the forward part of the automobile and to the wheels of the trailer, the screw lowering and raising device 25 is lowered against the plate 1 and it will be seen that as force is applied to the said plate that it will bring more weight farther forward on the car and farther to the rear of the trailer. It will also be seen that the front end of the trailer and the rear end of the car can be raised by increasing the distance between the plate 1 and the tongue of the trailer by continuing to screw the lifting device downward.

From the foregoing it will be seen that I have provided a novel and practical means for equalizing the weight of a trailer in its connection to a car, also means to lower or raise the front of the trailer and the rear of the car to the desired height. And also means to prevent rolling, weaving or rocking of the trailer while being towed, all of which can be economically manufactured.

Although reference has been made to specific parts of this invention, numerous variants are possible and contemplated within the scope of the claims hereto appended,
I claim as my invention:

1. In combination with a trailer hitch comprising, a drawbar provided with the ball part of a ball and socket joint and secured to a towing vehicle, a trailer tongue carrying the socket part of said ball and socket joint and a vertical raising device for the trailer tongue; a plate suspended below the trailer tongue, supporting truss rods secured at one end to the plate and extending upwardly at an angle to the rear, anchor bars secured to the trailer at a distance from the front end of the tongue and provided with slots to receive the upper ends of the truss rods which are threaded and have adjusting nuts to provide means to lower or raise the plate with relation to the tongue of the trailer, supporting truss rods secured at their forward ends to a member of the towing vehicle and extending downwardly at an angle to the plate and movably connected to the plate directly below and on a vertical axis with the ball and socket joint so as to allow turning of the hitch when the towing vehicle makes sharp turns, the lowering and raising device extending downwardly from a position near the front of the trailer tongue and adapted to bear on the upper surface of the said plate which in turn exerts a downward pull on the towing vehicle at a position forward from the ball and socket joint by means of the supporting truss rods and thereby causing the forward part of the towing vehicle to carry part of the load of the front part of the trailer.

2. In combination with a trailer hitch comprising, a drawbar provided with the ball part of a ball and socket joint and secured to a towing vehicle, a trailer tongue carrying the socket part of said ball and socket joint and a vertical raising device for the trailer tongue; truss rods secured to the trailer tongue at a distance toward the rear of the said ball and socket joint and extending on an angle downwardly and forwardly therewith, truss rods secured to a towing vehicle at a distance forwardly from the said ball and socket joint and extending on an angle downwardly and to the rear of the towing vehicle, a plate means suspended below the trailer tongue by all of said truss rods, the lower end of which are secured thereto, a means provided on the said plate to be engaged by the lower end of said raising device for the trailer tongue and adapted to exert an upward pressure thereto.

References Cited in the file of this patent

UNITED STATES PATENTS

| | | |
|---|---|---|
| 2,507,189 | Arehart | May 9, 1950 |
| 2,715,034 | Cornwall | Aug. 9, 1955 |
| 2,918,308 | Lowman | Dec. 22, 1959 |